US005228007A

United States Patent [19]

Murakami et al.

[11] Patent Number: 5,228,007

[45] Date of Patent: Jul. 13, 1993

[54] ULTRASONIC BEAM FORMING SYSTEM

[75] Inventors: Keiichi Murakami; Atsuo Iida; Tetsuya Matsushima, all of Kawasaki, Japan

[73] Assignee: Fujitsu Limited, Kawasaki, Japan

[21] Appl. No.: 854,887

[22] Filed: Mar. 20, 1992

[30] Foreign Application Priority Data

Mar. 20, 1991 [JP] Japan .................................. 3-057275

[51] Int. Cl.[5] .............................................. G01S 15/00

[52] U.S. Cl. ..................................... 367/103; 367/138

[58] Field of Search ........................... 367/103, 138, 7; 128/661.01; 73/617

[56] References Cited

U.S. PATENT DOCUMENTS 3,950,723 4/1976 Gilmour ............................. 367/103
4,140,022 2/1979 Maslak .................................... 367/7
4,662,223 5/1987 Riley et al. .......................... 367/103

*Primary Examiner*—Daniel T. Pihulic
*Attorney, Agent, or Firm*—Staas & Halsey

[57] ABSTRACT

An ultrasonic wave beam former including: a ultrasonic wave probe (1) equipped with a plurality of transducers (2) for converting a ultrasonic wave signal to an electric signal for effecting a dynamic focus by multiplying each channel signal as an output signal from each of the transducers (2) by a reference wave signal having the phase which is dynamically adjusted for each channel, and adding together each after-multiplication signal after the multiplication through a delay line (3), characterized in that at least two kinds of reference signals having mutually different frequencies are provided for each of the channels and at least two multipliers (10) are also provided;

each of the reference signals is constituted so as to receive an ultrasonic wave signal from a direction differenct from others and have a phase angle (*θ* (*i*)) adjusted so as to effect a dynamic focus;

the after-multiplication signal from each of the multipliers (10) for each channel is supplied to the delay line (3); and the superposed after-multiplication channel signal for each channel is added to one another through the delay line (3) and is subjected to a frequency separation by a filter (19) adapted to correspond to the frequency of the reference signal.

20 Claims, 12 Drawing Sheets

ULTRASONIC BEAM FORMING SYSTEM

BACKGROUND OF THE INVENTION

1. Filed of the Invention

The present invention relates to an ultrasonic beam forming system, and more particularly to a system for effecting simultaneous multi-directional reception and dynamic focussing while employing only a single delay line.

2. Description of the Related Art

An ultrasonic wave is focused in the following way. Each of a plurality of transducers arranged on the surface of an ultrasonic probe, is operated to convert a received ultrasonic wave signal into an electric signal. The electric signal from each transducer is amplified by a receiving amplifier, corresponding to each transducer, and fed into the delay line alloted to each transducer. The delay time of each delay line is adjusted to regulate focussing so that the signals reflected from a specified point of a human body, as received by each transducer, are output at the same time from the respective output terminals of the corresponding delay lines.

FIG. 1 shows a mode of a fixed focussing system in a conventional ultrasonic wave reception device. Reference numeral 1 in FIG. 1 denotes an ultrasonic probe, 2-*i* respective transducers, 3-*i* delay lines, T-*i* terminals and A an ultrasonic wave reflection point, or target In this figure, receiving amplifiers are not depicted.

The ultrasonic wave signal reflected from the point A is received by the transducers 2-*i* and each of said transducers 2-*i* converts the wave signal to an electric signal.

In this case, since the respective distances from the transducer 2-1 and the transducer 2-4, for example, to point A are different, the delay line 3-*i* is disposed for the transducer 2-i in order to correct for this distance difference. In other words, the difference of the distance is corrected so that ultrasonic emitted from the point A at the same time, are received and converted by the respective transducers 2-*i*, and appear simultaneously at each terminal T-*i*.

In the case of the system shown in FIG. 1, the delay time in the above-noted delay lines 3-*i* must be adjusted again whenever the position of the ultrasonic wave reflection point A becomes different i.e., changes.

FIGS. 2 and 3 show two different types of structures for the delay line shown in FIG. 1. In the drawings, reference numerals 3 and 3-*i* denote the delay line, and reference numeral 4 denotes a multiplexer. Symbol T-*i* denotes a terminal that corresponds to the terminal shown in FIG. 1.

In the case of FIG. 2, one delay line 3-*i* is provided for each channel (i.e., the channel corresponding to each transducer 2-*i*) shown in FIG. 1, and the delay time described above is adjusted, in principle, by a multiplexer 4.

In the case of FIG. 3, a single delay line 3 equipped with taps is provided for a plurality of channels, and the terminals 2-*i* and T-*i*, shown in FIG. 1 and corresponding to the respective channels, are connected to the multiplexer 4. The multiplexer 4 is constituted such that the signal connected to the terminal on the input side can be changeably connected (i.e., selectively switched) to each terminal on the output side. For example, the connection state described above is switched and set, depending on which input terminal should be guided to any particular transducer output. In other words, the delay time described above is decided in advance correctly, and a desired delay time is given to the signal from each channel at the output terminal of the delay line. The signals are then added together.

When a signal on any ultrasonic scanning line is received, the focus must be changed every moment from a short distance to a long distance. Therefore, the delay time of each delay line in FIG. 1 must be changed dynamically. It is necessary to change over a multiplexer dynamically in order to carry out such change in FIG. 2 or FIG. 3. Nevertheless, when a multiplexer is switched, a switching noise is produced to an extent which can not be neglected in comparison with level of signal passing through the multiplexer. Two typical methods are known which can solve these problems.

FIG. 4 shows an example of a two-route alternate switching system. Reference numerals 2-*i*, 3-*i* and letter A in FIG. 4 identify the same elements as in FIG. 1. Reference numeral 5-*i* denotes amplifiers, 6A and 6B delay line units for subsequent reflection points #1 and #2, 7A and 7B denote adders, 8 is a selector switch, and B and C denote other reflection points.

To accomplish the dynamic focussing described above, the delay lines 3-*i* shown in FIG. 1 are sequentially and simultaneously changed over as the position of the reflection point becomes different, (i.e., changes) in a manner so as to attain the corresponding delay times, respectively.

However, in this switching operation, a switching noise generally occurs. Therefore, in the system shown in FIG. 4, the units 6A and 6B are separately disposed so that while the unit 6A is adjusted so as to detect the ultrasonic wave signal from the refection point A or in other words, while the switch 8 is connected to the unit 6A side, the delay lines 3-*i* 2 are together (i.e., simultaneously adjusted in the unit 6B so that the ultrasonic wave signal from the reflection point B can be detected next in the unit 6B. While this unit 6B thereafter detects the ultrasonic wave signal from the reflection point B, the delay lines 3-*i* 1 in the unit 6A are together (i.e., simultaneously) adjusted so that the ultrasonic wave signal from the reflection point C can be detected next in the unit 6A.

This procedure reduces the serious influence of the switching noise generated at the switch 8, because the signal passing through the switch 8 is large enough due to the signal addition at the adder 7A or 7B in FIG. 4.

One of the problems in the case of the two-system alternate switching system shown in FIG. 4 is that two systems of respective delay line groups are necessary.

FIG. 5 shows an example of the case of a phase control system (Refer to U.S. Pat. No. 4,140,022). Reference numerals 2-*i*, 3, 5-*i* and A in the drawing correspond to those used in FIGS. 1, 3 and 4, respectively. Reference numeral 9-*i* denotes a signal waveform.

In the case of the system shown in FIG. 1, the difference of the distance from the reflection point A is corrected by the delay lines 3-*i*. However, it is possible to resolve that the focus is adjusted to the reflection point A, if the positive peak point of the alternating signal appearing, for example, at the terminal T-1 in FIG. 1, can be synthesized so as to superpose with the positive peak points of the respective alternating signals appearing at the terminals T-2, T-3, . . . , even though the correction for eliminating the difference of the distance described above is not made.

The phase control system shown in FIG. 5 utilizes this principle. In other words, the difference of the time t exists, between the signal 9-1 from the transducer 2-1 and the signal **9-*p* from the transducer 2-*p*, at the start as shown in the drawing. For this reason, the positive peak point of the signal 9-1 does not always coincide with the positive peak point of the signal 9-*p*** and may come to have an opposite phase, or as the case may be.

The phase control system shown in FIG. 5 is provided with a means for adjusting the phase of the signal **9-*p*, for example, and bringing it into conformity with the phase of the signal 9-1, though said means is omitted from FIG. 5**.

FIG. 6 shows the operation of the phase adjustment means. Reference numeral 10 denotes a multiplier. It will be hereby assumed that $$\cos(\omega t+\phi)$$

is supplied as the input signal, and $$\cos(\alpha t+\theta)$$

is supplied as the reference signal. In this case, the output signal of the multiplier 10 is given as follows:

$$\tfrac{1}{2}[\cos\{(\omega+\alpha)t+\phi+\theta\}+\cos\{\omega-\alpha)t+\omega-\theta]$$

When a filter is applied in a manner so as to extract a component having a frequency $(\omega-\alpha)/2\pi$, for example, from the output signal of the multiplier 10, this after-multiplication channel signal is given by $$\cos\{(\{\omega-\alpha)t+\phi-\theta\}.$$

It can thus be appreciated that the phase of the after-multiplication channel signal can be changed by adjusting the phase $\theta$ in the reference signal.

In the case of the phase control system shown in FIG. 5, the phase adjustment on the basis of the principle shown in FIG. 6 is applied to the signal **9-*p*, for example, so that its positive peak may be in conformity with that of the signal 9-1**.

As described above, these two systems are known as dynamic focussing.

On the other hand, in the ultrasonic diagnosis, the affected parts are scanned while the ultrasonic wave is generated, and the reflected wave is received. In this case, the diagnosis is carried out by transmitting the ultrasonic wave in a certain direction, receiving the reflected wave, transmitting the ultrasonic wave in the next direction to receive a reflected wave, and repeating these procedures. Therefore, the scanning time is made longer.

A simultaneous multi-directional reception system has been known in the past in order to improve this problem.

FIG. 12 shows a typical simultaneous multi-directional reception system. After the outputs of the transducers are amplified, the outputs of direction "1" are summed up, by an adder 104-1 to create a final output for a direction "1", whereas outputs of direction "2" are summed up by an adder 104-2 to create a final output for a direction "2".

FIG. 7 shows the operation of the simultaneous multi-directional reception system, and FIG. 8 is a view showing sound pressure vs. direction characteristics in FIG. 7. Reference numerals **2-*i*, 5-*i*, Ai and Bi correspond to those used in FIG. 1, etc. Reference numeral 11 denotes a transmission direction of the ultrasonic wave, 12-1 and 12-2 are reception directions, and 13-1 and 13-2** are focussing units, respectively.

In the case of the simultaneous multi-directional reception system shown in FIG. 7, the ultrasonic wave is transmitted in the direction represented by reference numeral 11, a first direction focussing unit 13-1 is so set as to receive a reflection from a point Al in the direction 12-1 and a second direction focussing unit 13-2 is set so as to receive a reflection from a point A2 in the direction 12-2 shown in the drawing. Needless to say, it can be understood that dynamic focussing is effected in the respective focussing units **13-*i* in a manner so as to receive the reflection from the point B1 or B2** in the same direction.

FIG. 8 is a drawing explaining the principle of the simultaneous multi-directional reception. Reference numeral 14 in FIG. 8 denotes transmission directivity characteristics in the direction 11, reference numeral 15-1 reception directivity characteristics in the return direction 12-1 and reference numeral 15-2 reception directivity characteristics in the return direction 12-2.

When the directivity characteristics described above are characteristics 14 and 15-1 as shown, respectively, the directivity characteristics of the signal received by the transducer **2-*i* become the overall reception characteristics as represented by reference numeral 16-*i* in FIG. 8. It is possible to consider that the first direction focussing unit 13-1 and the second direction focussing unit 13-2 are arranged in a manner so as to match the characteristics 16-1 and 16-2** shown in the drawing, respectively.

The following can be noted when the hardware quantities (particularly the numbers of the delay lines) are compared with one another between the fixed focus system shown in FIG. 1, the two-route alternate switching system shown in FIG. 4 and the phase control system shown in FIG. 5. In other words, when the quantity of the system shown in FIG. 1 is assumed to be "1", the quantity of the system shown in FIG. 4 is "2" and the quantity of the system shown in FIG. 5 is "1".

Furthermore, the following can be noted in the simultaneous multi-directional reception system shown in FIG. 7:

(1) The hardware quantity described above is "2" when the fixed focussing is employed.

(2) The above quantity is "4" when the two-route alternate switching system is employed.

(3) The above quantity is "2" when the phase control system is employed.

From the above, the above quantity becomes "2" even when the phase control system is employed, if the simultaneous multi-directional reception system is used after accomplishing dynamic focussing.

In accordance with the present invention, even only one (i.e., a single) route beam former can perform dynamic focussing and further, a simultaneous multi-directional reception can be effected.

SUMMARY OF THE INVENTION

The present invention is directed to solving these problems of dynanmic focusing and an object of the present invention is to provide an ultrasonic wave reception beam system that makes it possible to employ dynamic focussing and at the same time, to function as a simultaneous multi-directional reception system, while the number of necessary lines is maintained as "1".

In accordance with a feature of the invention, there is provided an ultrasonic reception beam former including an ultrasonic probe (1) equipped with a plurality of transducers (2) for converting a ultrasonic signal to an electric signal, for effecting dynamic focussing by multiplying each channel signal as an output signal from each of the transducers (2), by a reference signal having a phase dynamically adjusted for each channel, and adding together each after-multiplication signal after a frequency separation filter through a delay line (3), characterized in that at least two kinds of reference signals having mutually different frequencies are provided for each of the channels and at least two multipliers (10) are also provided;

each of the reference signals is constituted so as to receive an ultrasonic signal from a direction different from others and to have a phase angle ($\theta$(i)) adjusted so as to effect dynamic focussing;

the after-multiplication signal from each of the multipliers (10) for each channel is supplied to the delay line (3); and the superposed after-multiplication channel signal for each channel is added to one another through the delay line (3) and is subjected to frequency separation by a filter (19) adapted to correspond to the frequency of the reference signal.

PREFERRED EMBODIMENTS OF THE INVENTION

An embodiment of the present invention will be described in detail with reference to the figures.

Figure 9A:
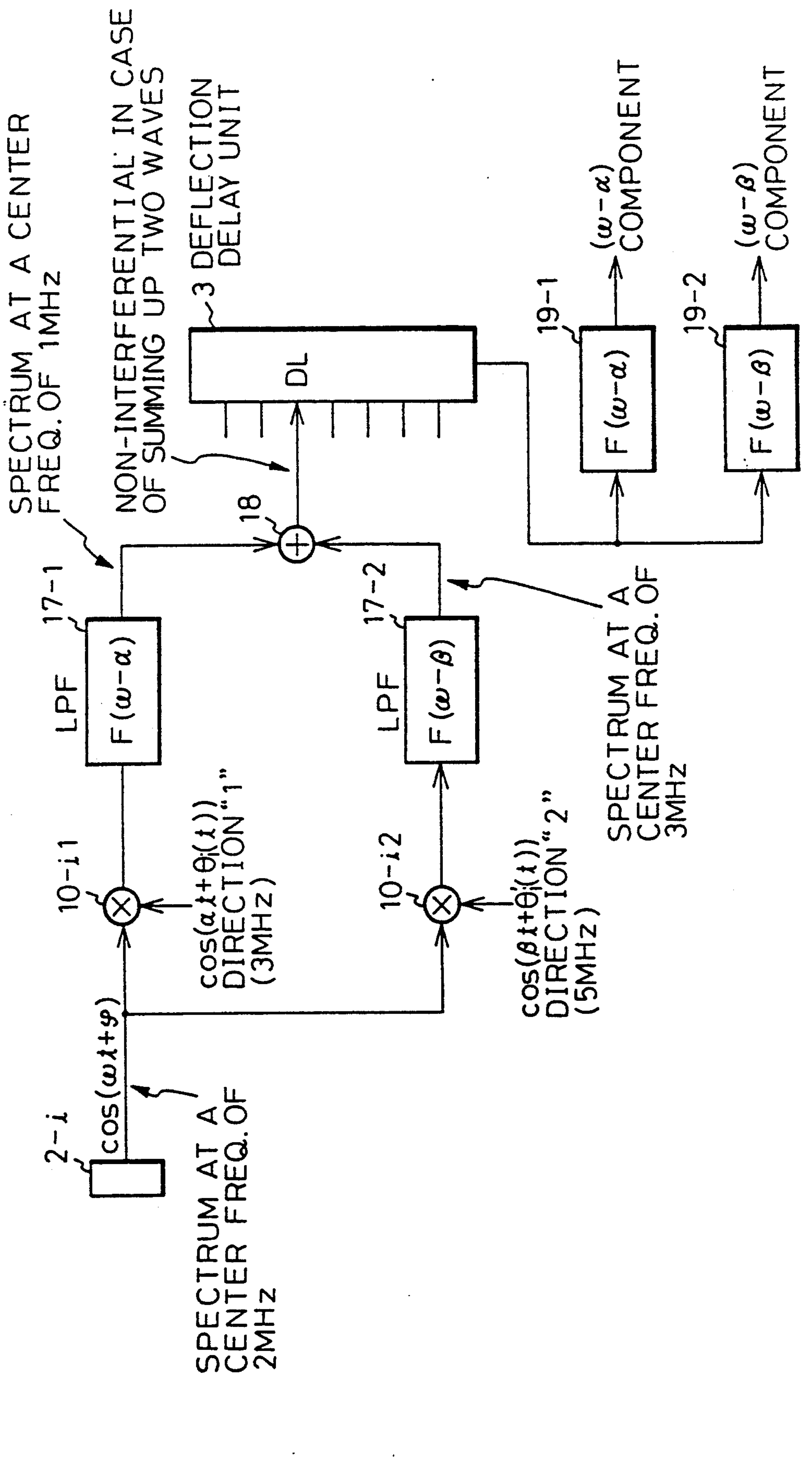
FIG. 9(A) is schematic block diagram of the configuration of the system of the present invention and FIG. 9(B) is a plot of band characteristics of each filter and an output of a transducer in the system of FIG. 9(A).
Figure 9B:
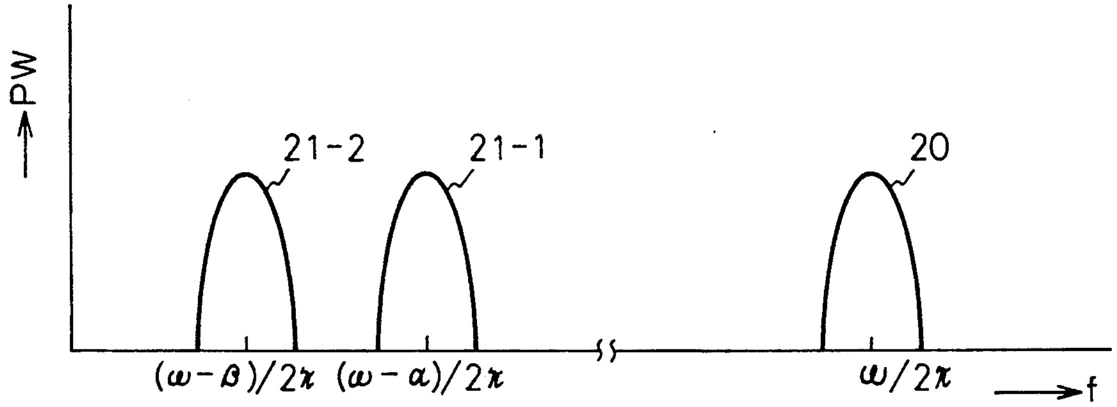
Figure 10A:
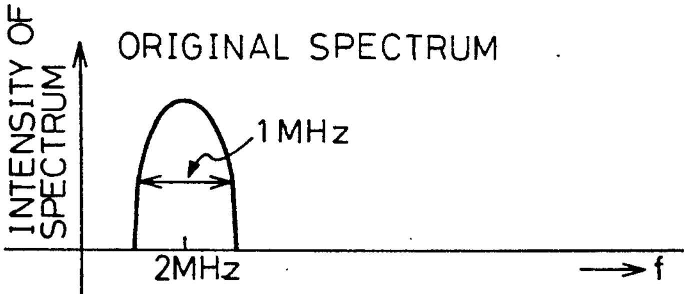
FIG. 10(A) to 10(E) are plots of spectrum characteristics after mixing with a reference wave of 3 MHZ and 5 MHZ and the relationship between directions "1" and "2.
Figure 10B:
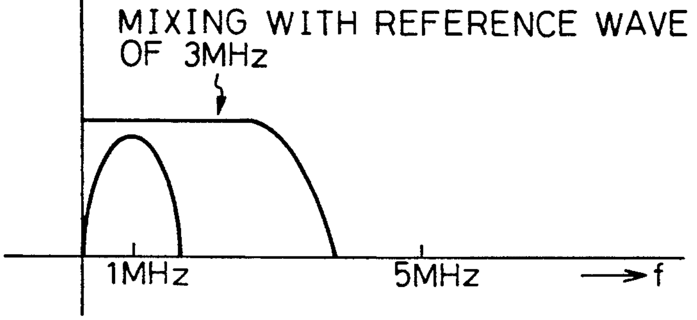
Figure 10C:
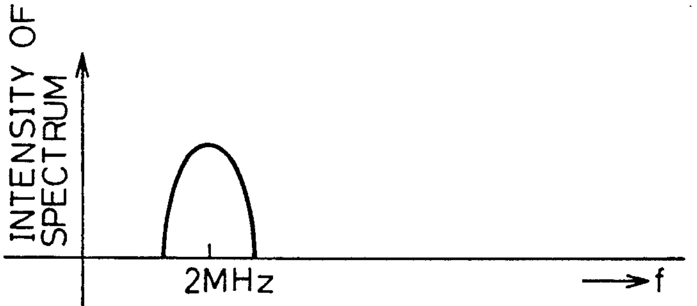
Figure 10D:
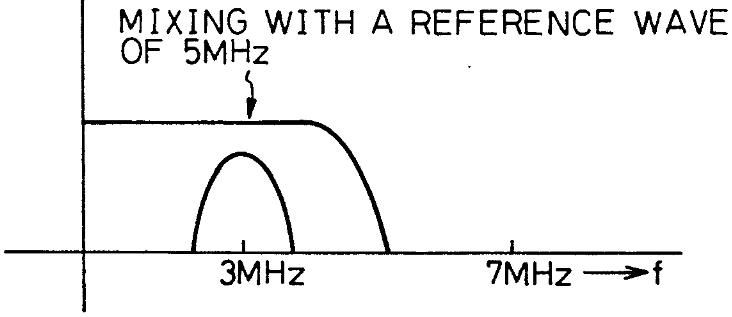
Figure 10E:
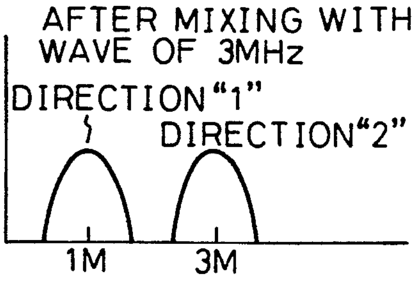

FIG. 9(A) is schematic block diagram of the configuration of the system of the present invention, and FIG. 9(B) is a plot of band characteristics of each filter and an output of a transducer in the system of FIG. 9(A). Reference numeral 17-*i* represents a band-pass filter, 18 is an adder and 19-*i* is a band-pass filter. Reference numeral 20 represents frequency band characteristics of a signal from the transducer 2-*i*, 21-1 represents frequency band characteristics of a signal from the filter 17-1, and 21-2 frequency band characteristics of a signal from the filter 17-2.

FIG. 9(A) can be considered as typifying the system structure for one transducer 2-*i* (or in other words, a structure corresponding to one channel i). In FIG. 9(A), a first reference signal $$\cos(\alpha t+\theta_1(t)$$

and a second reference signal $$\cos(\beta t+\theta_1'(t)$$

are selected so that an angular frequency $\alpha$ and an angular frequency $\beta$ have mutually different values, for the purpose of discriminating reception signals corresponding two to mutually different respective directions, when a simultaneous multi-directional reception system is employed.

The phase angle $\theta$(t)of the first reference signal and the phase angle $\theta_i$(t) of the second reference 389 signal are respective the combination of (i) phase angles $\delta$, $\delta'$ for providing directional characteristics corresponding to mutually different directions when the simultaneous multi-directional reception system is employed, and (ii) respective changes of the phase angles $\xi$(t) and $\xi'$ (t) as employed for effecting dynamic focusing by a phase control system.

In other words, the phase angle $\theta_i$(t) of the first reference signal is given by:

$$\theta_i(t)=+\xi(t)$$

phase angle $\theta_2$ of the second reference signal is given by:

$$\theta_i(t)=\delta'+\xi'(t)$$

The filter 17-1 and the filter 19-1 are band-pass filters for extracting signal component having a frequency $(\omega-\alpha)/2\pi$, and the filter 17-2 and the filter 19-2 are band-pass filters for extracting a signal component having a frequency $(\omega-\beta)/2\pi$.

The function of FIG. 9(A) will be described hereinafter.

The output from a multiplier 10-*il* has a component having the frequency $(\omega+\alpha)/2n$ and a component having the frequency $(\omega-\alpha)/2\pi$. The output from a multiplier 10-*i2*) has a component having the frequency $(\omega+\beta)/2\pi$ and a component having the frequency $(\omega-\beta)/2\pi$.

The output of the filter 17-1 is and change the signal only component having the frequency $(\omega-\alpha)/2\pi$ and the output of the filter 17-2 is only the signal component having the frequency $(\omega-\beta/2\pi$. As described above, the former carries reception data from the first direction in the simultaneous multi-directional reception system and the latter similarly carries the reception data from the second direction.

The signal components output by 17-1 and 17-2 are superposed by the adder 18, and are then guided to a delay line 3, as a superposed after-multiplication channel signal corresponding to one channel in which each such signal is first subjected to time matching with and respective superposed after-multiplication channel signals from other channels, and then the time-matched such signals are added together and output as a final superposed signal.

The final superposed signal output from the delay line 3 is segmented into separate signal components having respective frequency components by the band-pass filters 19-*i*. In other words, the output from the filter 19-1 is the respective sum of the "first direction after-multiplication channel signals", each of which carries the reception information from the first direction in the corresponding channel, for all the channels. The output from the filter 19-2 is similarly the sum of the "second direction after-multiplication channel signals", each of which carries the reception information from the second direction in the corresponding channel, for all the channels.

The output from each filter **19-*i*** comes to possess information resultant from dynamic focus focusing by changing the above-mentioned values ξ(t) and ε'(t) of the phase angles $\theta_1$ and $\theta_2$, respectively in the corresponding reference signals.

Needless to say, the band characteristics of the signal from the transducer **2-*i* are represented by reference numeral 20 in FIG. 9(B), the band characteristics of the output from the filter 17-1 are represented by reference numeral 21-1 in the drawing and the band characteristics of the output from the filter 17-2 are represented by reference numeral 21-2** in the drawing.

Therefore, even when the outputs of both filters 17-1 and 17-2 are added by the adder 18 and are then passed through the delay line ("Detection Delay Unit") 3, they can be separated subsequently from each the filters **19-*i*.**

In the case of the present invention, therefore, the number of the delay line may be only "one" (i.e., only a single delay line is required) even though the simultaneous multi-directional reception system is implemented and dynamic focussing is effected.

Figure 1:
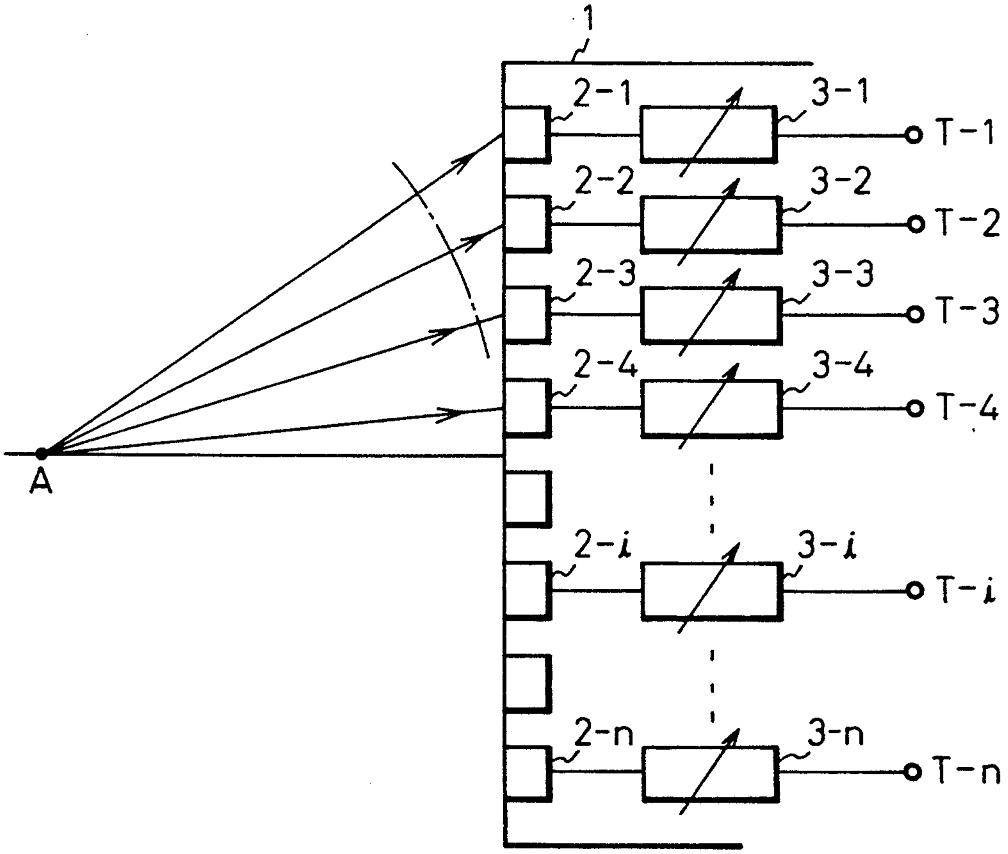
FIG. 1 is a schematic of a fixed focussing system in a conventional ultrasonic wave reception.
Figure 2:
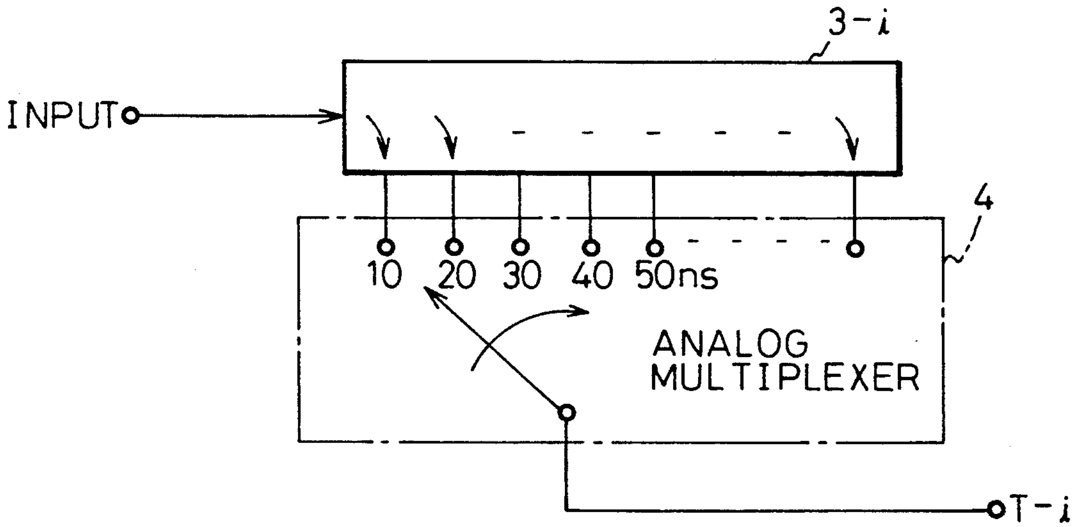
FIG. 2 and 3 are schematics of different types of structures of the delay line shown in FIG. 1.
Figure 3:
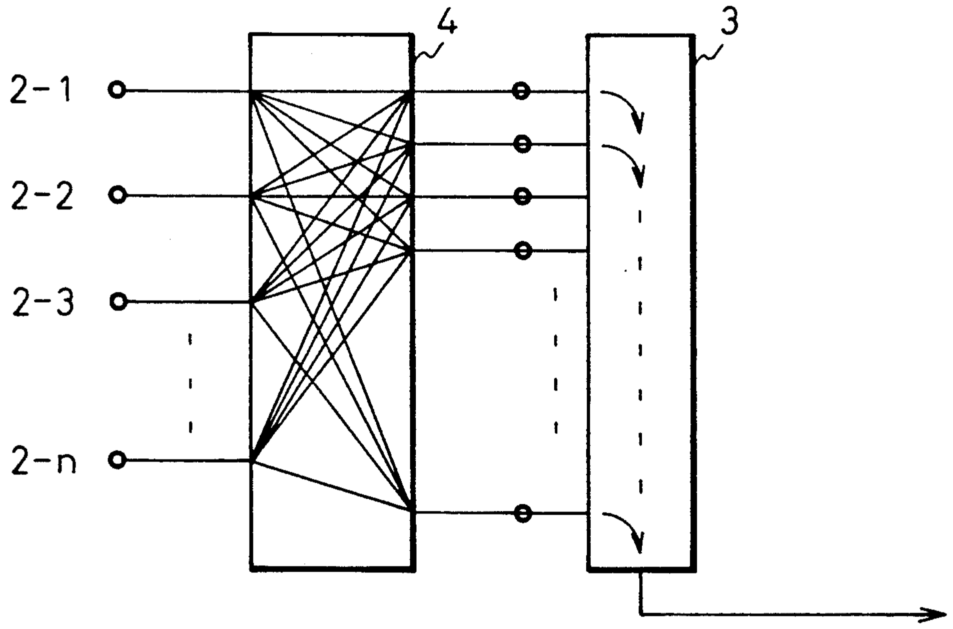
Figure 4:
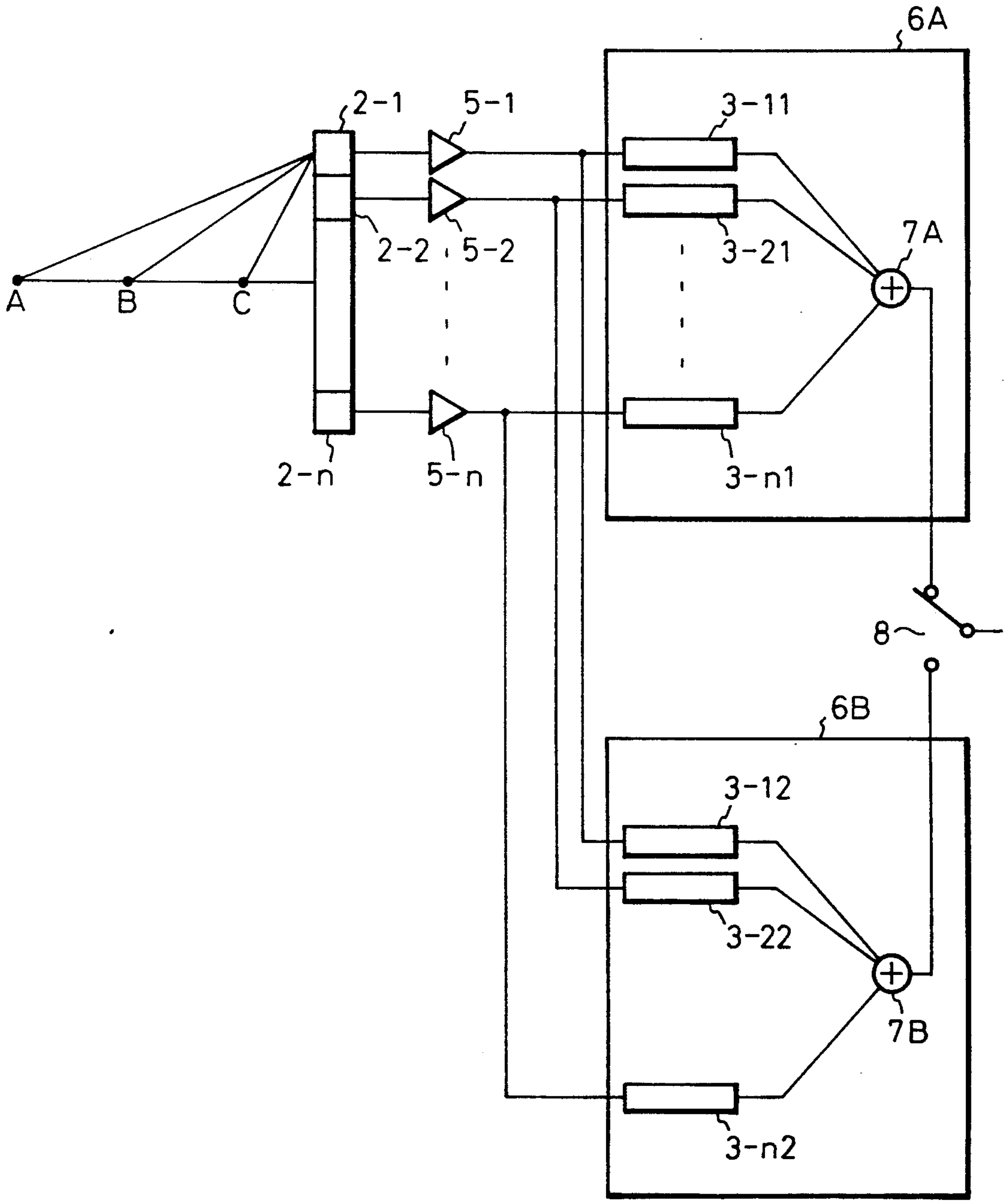
FIG. 4 is a schematics of a two-route alternate switching system.
Figure 5:
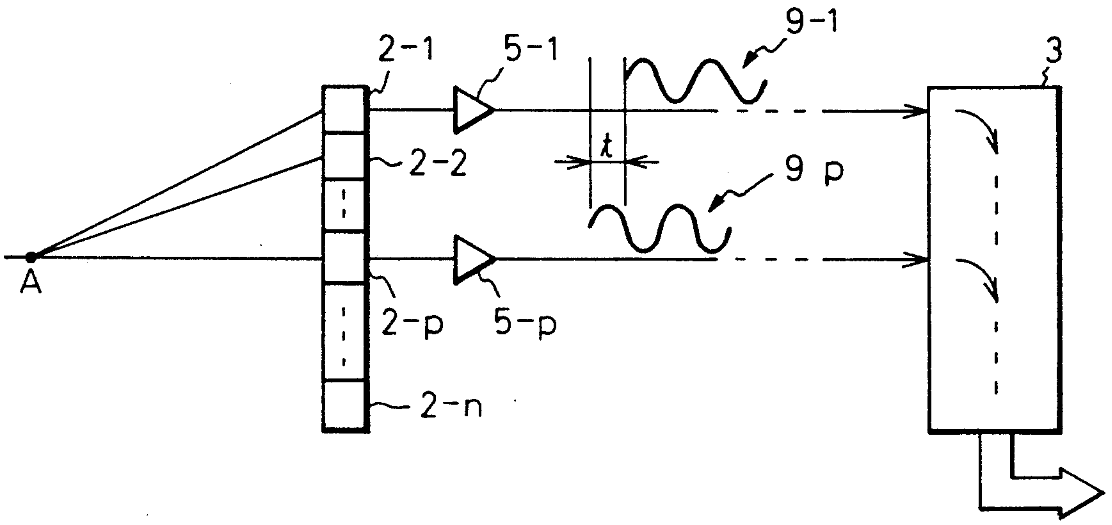
FIG. 5 is a schematic of a phase control system.
Figure 6:
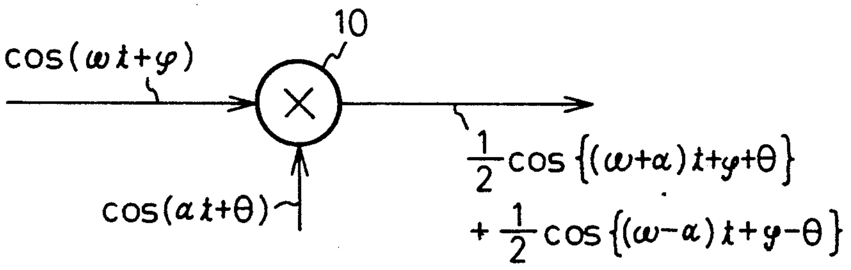
FIG. 6 is a logic diagram of the operation of phase adjustment.
Figure 11:
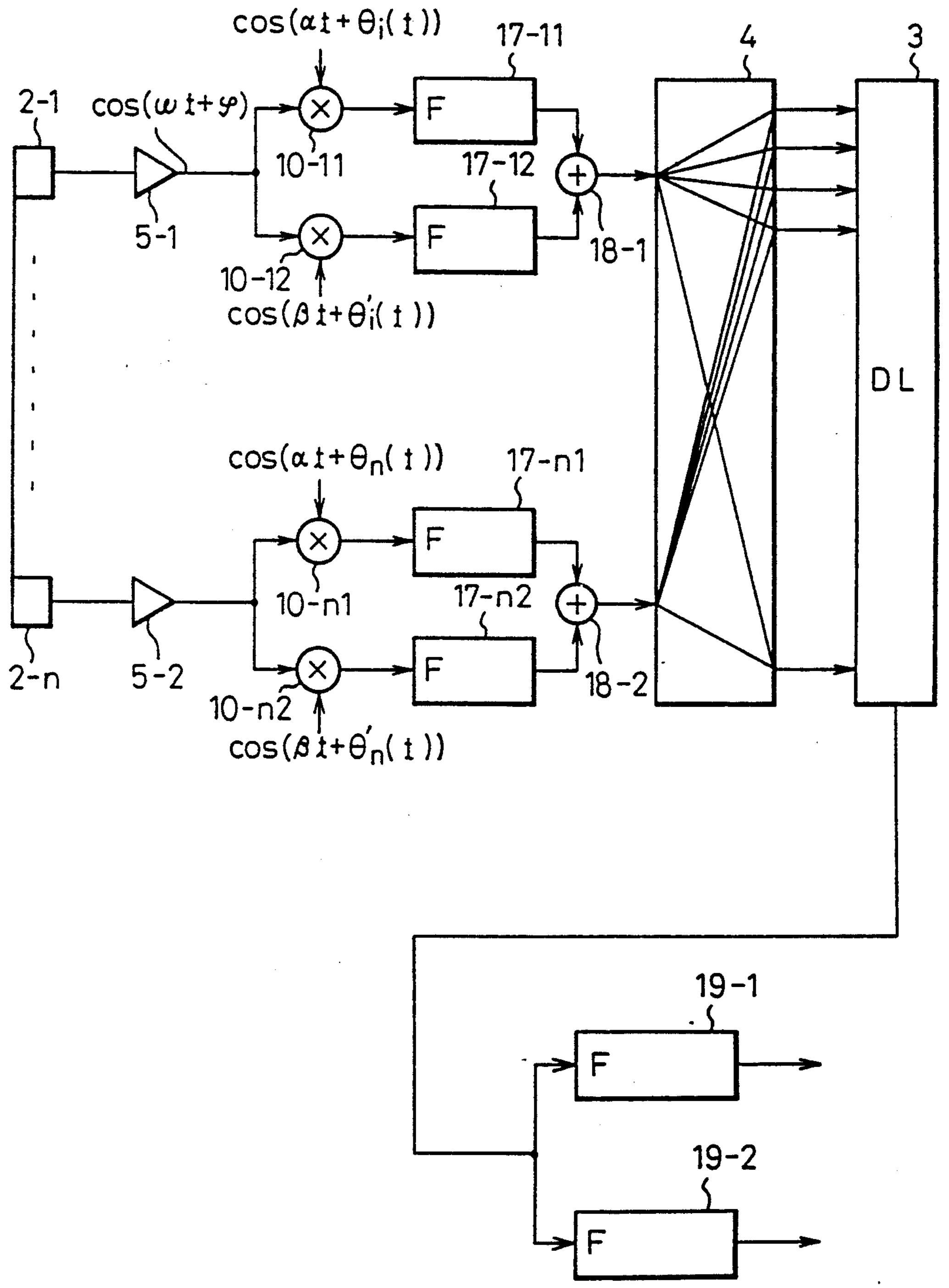
FIG. 11 is a schematic block design of an embodiment in accordance with the present invention.
Figure 12:
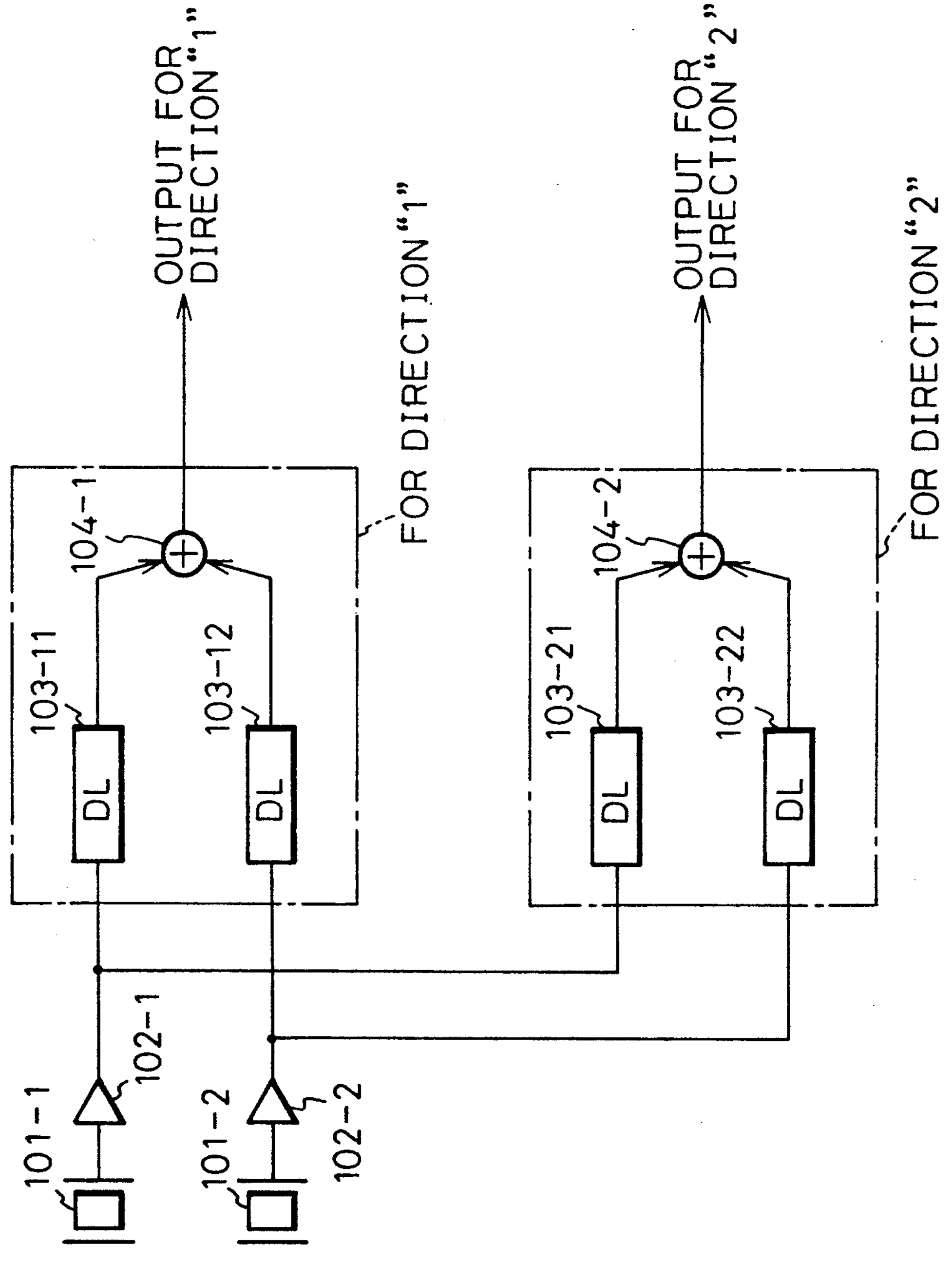
FIG. 12 is a schematic block diagram of a mode of a simultaneous multi-directional reception system.

FIG. 11 shows the structure of an embodiment of the present invention. In the drawing, reference numerals 2, 3, 5, 10, 17, 18 and 19 correspond to those same reference numerals as used in FIG. 9(A) as reference numeral 4, as in FIGS. 2 and 3.

The frequency of the first reference signal in the first channel corresponding to the transducer 2-1, . . . , and the frequency of the first reference signal in the nth channel corresponding to the transducer 2-n are the same.

Similarly, the frequency of the second reference signal in the first channel, . . . , and the frequency of the second reference signal in the nth channel are the same.

As explained with reference to FIG. 9(A), the phases of the two reference signals in the first channel are as follows:

first reference signal . . . $\theta_1(1)=\delta(1)+\delta(1, t)$ second reference signal . .. $\theta_1'(t)=\delta'(1)+\xi'(1, t)$ Similary, the phases of the two reference signals in the nth channel are as follows, as explained with reference to FIG. 9(A).

first reference signal . . . $\theta_n(t)=\delta(n)+\xi(n, t)$ second reference signal . . . $\theta_N(t)\delta'(n)+\xi'(n, t)$ Needless to say, the frequency components of the two signals added in the adder **18-*i* can preferably be separated from each other. The frequency components of the output at the filter 19-*i*** are mutually separated.

By the way, the adder 18 and the adder **18-*i* in FIGS. 9(A) and 11**, respectively are not always indispensable but can be omitted, whenever necessary.

Figure 7:
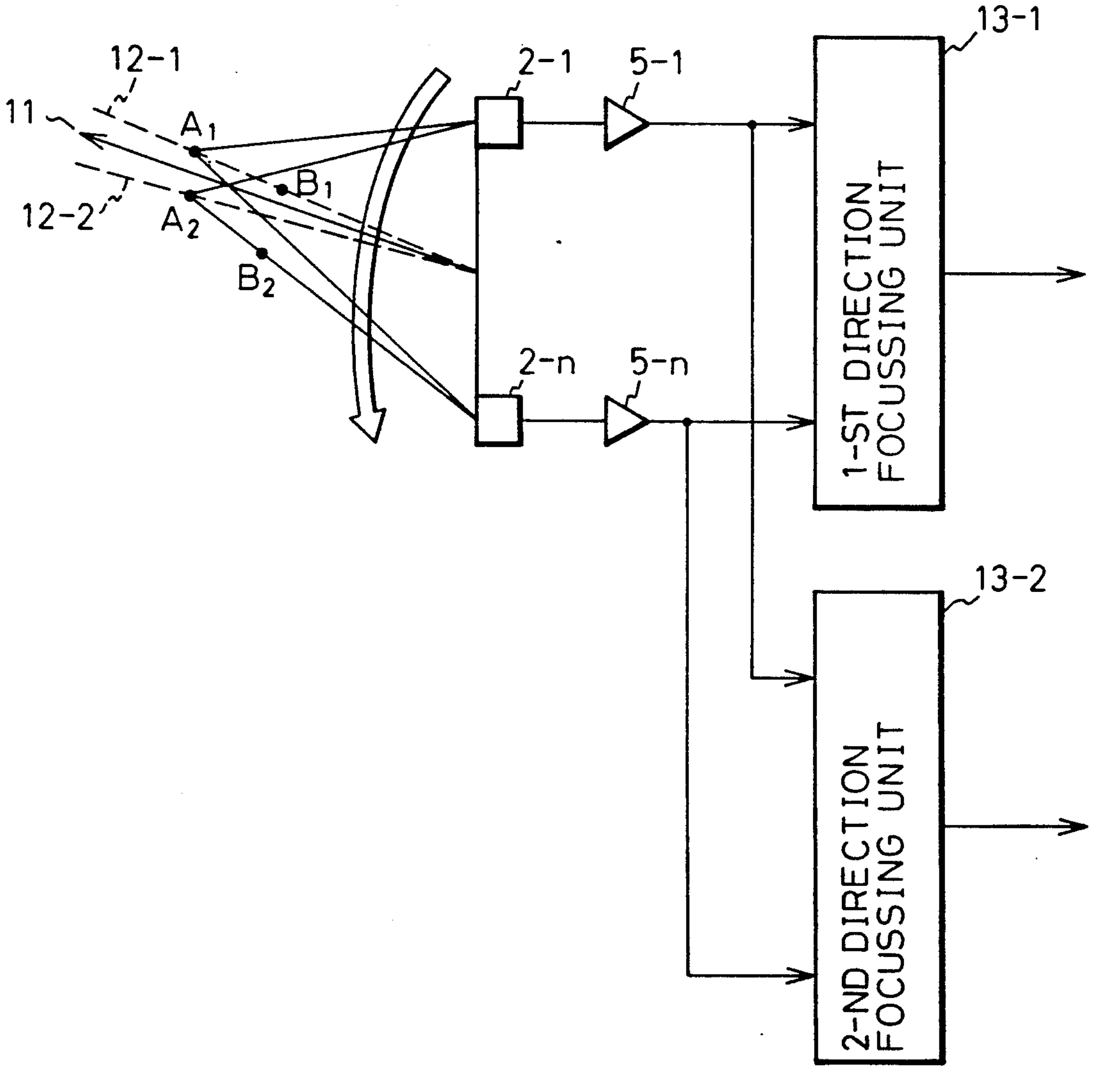
FIG. 7 is a schematic view illustrating the operation of a simultaneous multi-directional reception system.
Figure 8:
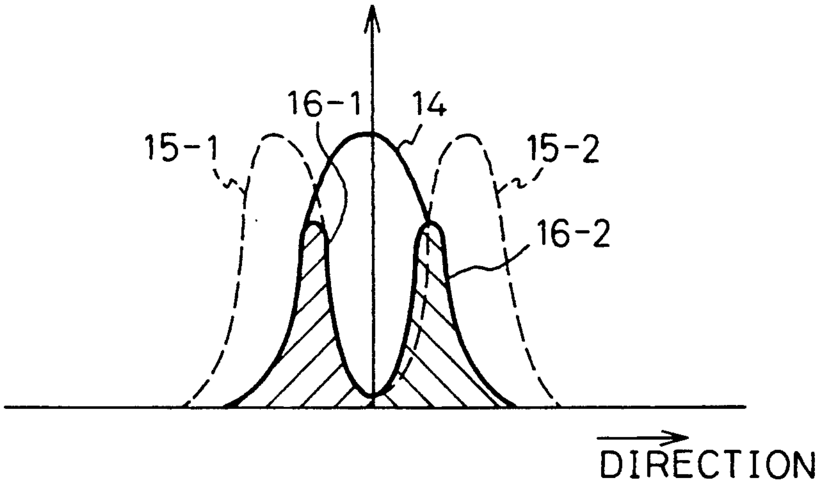
FIG. 8 is a plot of sound pressure vs. direction characteristics in FIG. 7.

Needless to say, furthermore, the directions 11, **12-*i* shown in FIG. 7, for example, in the case of the simultaneous multi-directional reception system, are changed by scanning with the passage of time as represented by a blank arrow. Therefore, in the case of FIGS. 9 and 11, scanning as described above is carried out by changing the angles δ(i) and δ'(i) with the time and/or by changing the switch position by the multiplexer 4**.

The explanation given above deals with only the reception signal having the frequency Wo. If the band width of the reception signal is narrow to a certain extent (Refer to U.S. Pat. No. 4,140,022), the above can be established naturally for all reception signals having the band width described above.

If the frequency separation of the spectra of two intermediate frequency signals having multi-directional directivity cannot be accomplished by a simple mixer because the band width of the reception signal is not zero, the frequency separation may of course be carried out by a double heterodyne system.

As described above, according to the present invention, the number of the delay line is only "one" (i.e., only a single delay line is employed), although the simultaneous multi-directional reception system is employed and dynamic focussing is carried out.

We claim:

1. An ultrasonic reception beam processing system including an ultrasonic probe equipped with a plurality of transducers and having a respectively corresponding plurality of channels, each transducer converting an ultrasonic signal, reflected from a target position and received thereby, to a channel electric signal and the system effecting dynamic focussing by multiplying each channel electric signal, as output by each of said transducers, by a corresponding reference signal having the phase thereof dynamically adjusted for each channel and adding together each after-multiplication signal, after processing same through a respective frequency separation filter, to produce a superposed after-multiplication channel signal which is processed through a delay line, characterized in that:

at least first and second reference signals having respective and mutually different frequencies and phases and at least first and second, respective multipliers are provided for each of said channels, each multiplier receiving the respective reference signal as a first input thereto, each multiplier receiving and multiplying the corresponding channel electric signal by the respective reference signal and producing a corresponding after-multiplication channel signal as the output thereof;

each of said reference signals is constituted so as to correspond to and discriminate an ultrasonic signal as reeived by the corresponding transducer from a corresponding direction different other such ultrasonic signals received by the corresponding transducer from respective, other corresponding directions and to have the phase angle thereof adjusted so as to effect dynamic focussing;

said after-multiplication signal from each of said multipliers for each channel, after said processing thereof through a respective frequency separation filter, is supplied to said delay line; and said superposed after-multiplication channel signals for the respective, plural channels, are time-shifted and added to one another in said processing through said delay line for producing a final superposed output signal of said delay line which is subjected to frequency separation by at least first and second filters respectively adapted to correspond to the mutually different frequencies of the at least first and second reference signals.

2. An ultrasonic reception beam former according to claim 1, wherein the respective frequencies of said at least first and second reference signals are selected so that the frequency bands of said after-multiplication channel signals, obtained from said respective multipliers in each of said plurality of channels, do not substantially overlap each other.

3. An ultrasonic reception beam former according to claim 1, wherein said after-multiplication signal from each of said multipliers in each of said channels is filtered by said respective frequency separation filter so as to extract only selected frequency components, and is then supplied to said delay line.

4. An ultrasonic reception beam former according to claim 3, wherein, within each channel, said selected frequency components extracted by each said frequency separation filter are selected so that the frequency band of the after-multiplication channel signal, after said filtering, does not substantially overlap with the frequency band of any other of said after-multiplication channel signals of the channel.

5. An ultrasonic wave reception beam former according to claim 1, wherein the respective at least two said after-multiplication channel signals in each said channel are superposed with one another before they are supplied to said delay line, and the superposed after-multiplication signal of each said channel is then supplied to said delay line.

6. An ultrasonic reception beam former according to claim 1, wherein said delay line has plural taps, and said after-multiplication channel signals of said respective channels are supplied to said taps of said delay line through a multiplexer.

7. A ultrasonic wave reception beam former according to claim 2, wherein the respective at least two said after-multiplication channel signals in each said channel are superposed with one another before they are supplied to said delay line, and the superposed after-multiplication signal of each said channel is then supplied to said delay line.

8. An ultrasonic wave reception beam former according to claim 3, wherein the respective at least two said after-multiplication channel signals in each said channel are superposed with one another before they are supplied to said delay line, and the superposed after-multiplication signal of each said channel is then supplied to said delay line.

9. An ultrasonic wave reception beam former according to claim 4, wherein the respective at least two said after-multiplication channel signals in each said channel are superposed with one another before they are supplied to said delay line, and the superposed after-multiplication signal of each said channel is then supplied to said delay line.

10. An ultrasonic reception beam former according to claim 2, wherein said delay line has plural taps, and said after-multiplication channel signals of said respective channels are supplied to said taps of said delay line through a multiplexer.

11. An ultrasonic reception beam former according to claim 3, wherein said delay line has plural taps, and said after-multiplication channel signals of said respective channels are supplied to said taps of said delay line through a multiplexer.

12. An ultrasonic reception beam former according to claim 4, wherein said delay line has plural taps, and said after-multiplication channel signals of said respective channels are supplied to said taps of said delay line through a multiplexer.

13. An ultrasonic reception beam former according to claim 5, wherein said delay line has plural taps, and said after-multiplication channel signals of said respective channels are supplied to said taps of said delay line through a multiplexer.

14. An ultrasonic reception beam former according to claim 7, wherein said delay line has plural taps, and said after-multiplication channel signals of said respective channels are supplied to said taps of said delay line through a multiplexer.

15. An ultrasonic reception beam former according to claim 8, wherein said delay line has plural taps, and said after-multiplication channel signals of said respective channels are supplied to said taps of said delay line through a multiplexer.

16. An ultrasonic reception beam former according to claim 9, wherein said delay line has plural taps, and said after-multiplication channel signals of said respective channels are supplied to said taps of said delay line through a multiplexer.

17. A system for processing ultrasonic beams and employing an ultrasonic probe having a plurality of transducers disposed in an array and having a plurality of signal channels respectively associated with the plurality of transducers with each channel receiving as an input thereto the electrical signal output of the associated transducer, as converted from an ultrasonic beam received by the corresponding transducer, the system providing for processing at least first and second beams as reflected from corresponding target positions and received by each transducer of the array from corresponding, at least first and second different directions and comprising:

means for supplying to each of said channels at least first and second reference signals having corresponding, at least first and second, mutually different frequencies corresponding to and discriminating between the respective, at least first and second ultrasonic signals as received by the associated channel transducer from respective, at least first and second mutually different directions and for dynamically adjusting the respective phases of the at least first and second reference signals to effect dynamic focusing;

at least first and second multipliers, in each said channel, commonly receiving the channel electrical signal output of the corresponding sensor and respectively receiving, and multiplying the channel electrical signal output by, the at least first and second reference signals and producing respective, at least first and second after-multiplication output signals, each after-multiplication output signal including signal components having frequencies equal to the sum and the difference of the respective frequencies of the corresponding reference signal and the channel electric signal;

at least first and second channel filters, in each channel, having frequency band-pass characteristics corresponding to commonly selected ones of the signal components of the respective, at least first and second after-multiplication output signals and producing corresponding and respective, at least first and second selected component output signals;

an adder in each channel which adds the first and second selected component output signals of the corresponding channel filters and produces a superposed component signal;

a delay unit which receives and selectively delays the superposed component signals from the respective adders of the plurality of channels and adds the selectively delayed, superposed component signals and produces a final superposed output signal; and at least first and second output filters having frequency band-pass characteristics respectively corresponding to those of the at least first and second channel filters and which extract corresponding first and second components from the final superposed output signal and produce same as respective, at least first and second system output signals.

18. A system as recited in claim 17, further comprising:

a multiplexer having a plurality of inputs respectively corresponding to the plurality of channels and receiving at the inputs thereof the respective, superposed component signals output by the corresponding adders of the plurality of channels and having a plurality of outputs; and the tapped delay line has a plurality of input taps connected respectively to the plurality of outputs of the multiplexer.

19. A system as recited in claim 17, wherein the respective frequencies of said at least first and second reference signals supplied to each of said plurality of channels are selected so that the respective frequency bands of said corresponding, at least first and second multipliers in each said channel do not substantially overlap each other.

20. A system as recited in claim 19, wherein the frequency band-pass characteristics of the at least first and second channel filters are selected so that the respective frequency bands of the at least first and second selected component output signals do not substantially overlap.

* * * * *

UNITED STATES PATENT AND TRADEMARK OFFICE

CERTIFICATE OF CORRECTION

PATENT NO. : 5,228,007

DATED : July 13, 1993

INVENTOR(S) : MURAKAMI et al.

It is certified that error appears in the above-indentified patent and that said Letters Patent is hereby corrected as shown below:

Col. 2, line 12, after "with" insert --the--.

Col. 6, line 17, delete "389";
line 18, delete "respective" and after "(i)" insert --respective--;
line 28, change "$\theta_i\lambda(t) = +\xi(t)$" to --$\theta_i\lambda(t) = \delta + \xi(t)$--;
line 36, after "extracting" insert --a--;
line 48, change "and change" to --only--;
line 49, delete "only".

Col. 7, line 1, change "respective sum of the" to --sum of the respective--;
line 11, delete "focus";
line 12, change "$\epsilon'(t)$" to --$\xi'(t)$--;
line 25, after "each" insert --other by--;
line 53, change "$\theta_N$" to --$\theta_n$--;
line 67, delete "the" (second occurrence).

Col. 8, line 46, change "reeived" to --received--.

Signed and Sealed this

Twelfth Day of July, 1994

Attest:

BRUCE LEHMAN

*Attesting Officer* *Commissioner of Patents and Trademarks*